F. H. JOHN.
SPRING WHEEL.
APPLICATION FILED JUNE 19, 1911.

1,025,981.

Patented May 14, 1912.

Witnesses

Frederick H. John,
Inventor by C. A. Snow & Co.
Attorneys

UNITED STATES PATENT OFFICE.

FREDERICK H. JOHN, OF MIDDLEPORT, PENNSYLVANIA.

SPRING-WHEEL.

1,025,981.  Specification of Letters Patent.  Patented May 14, 1912.

Application filed June 19, 1911. Serial No. 633,947.

*To all whom it may concern:*

Be it known that I, FREDERICK H. JOHN, a citizen of the United States, residing at Middleport, in the county of Schuylkill and State of Pennsylvania, have invented a new and useful Spring-Wheel, of which the following is a specification.

It is the object of the present invention to provide a wheel, the spokes of which are resilient, and of novel form, whereby the pneumatic tires commonly used, may be dispensed with.

A further object of the invention is to provide novel means for assembling the spokes with the hub of the wheel, and to provide novel means for adjusting the rim of the wheel, to engage with, and to hold the tire.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
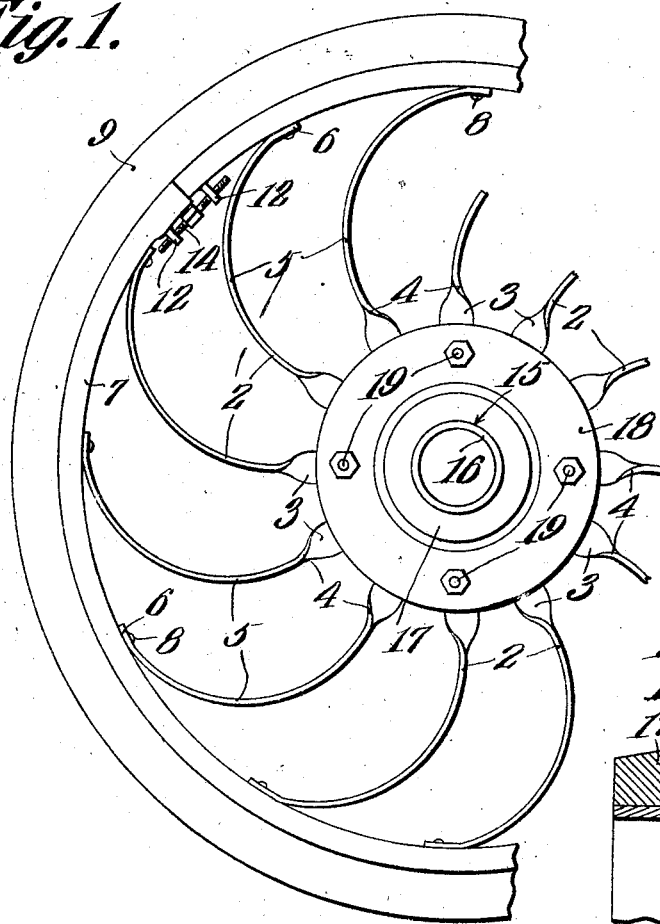
Figure 2:
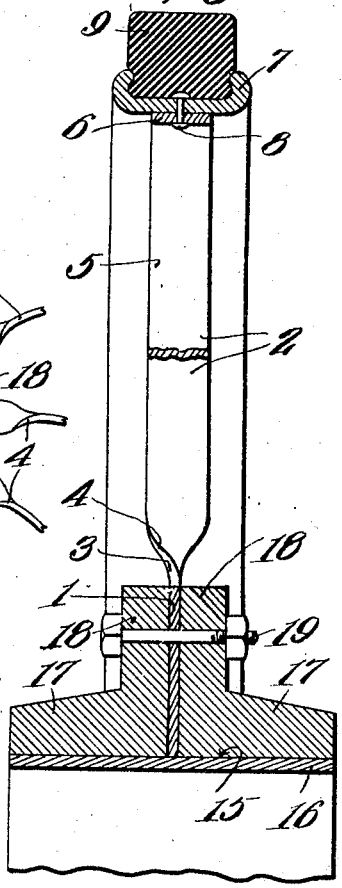
Figure 3:
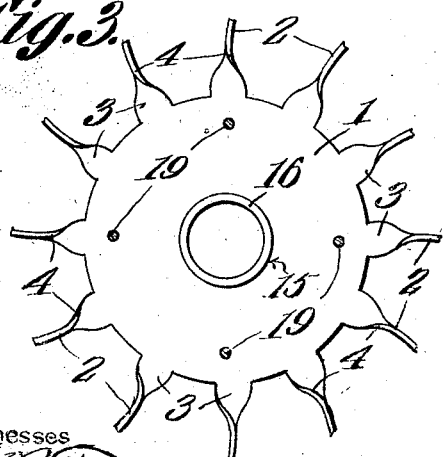

In the accompanying drawings,—Figure 1 is a fragmental side elevation of a wheel constructed in accordance with my invention; Fig. 2 is a fragmental transverse section; Fig. 3 is a side elevation of the spoke-plate from which the spokes extend; and Fig. 4 is a detail perspective of the meeting ends of the rim.

In carrying out the invention there is provided as a primary and fundamental element, a spoke plate denoted generally by the numeral 1. From the spoke plate 1 extends a plurality of spokes, denoted generally by the numeral 2. The spokes 2 are formed integrally with the plate 1, and the inner ends 3 of the spokes 2 are disposed in a common plane with the plate 1. Beyond the portions 3, the spokes 2 are twisted, as shown at 4, so that their body portions 5 lie in a curved surface, at right angles to the plane of the body 1. The portions 5 of the spokes are curved in a common direction, the extremities 6 of the spokes lying in a common circumference, tangentially to the rim 7, which may be of any form. The ends 6 of the spokes are secured to the rim by means of bolts 8 or the like. The rim 7 is inclosed by the tire 9 which is preferably solid, and fashioned from rubber.

Figure 4:
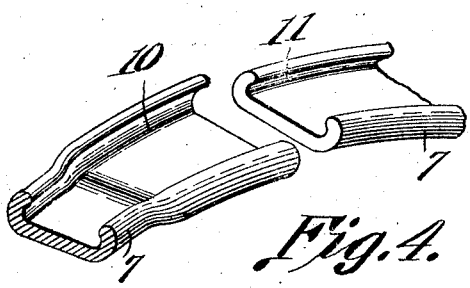

Noting Fig. 4 it will be seen that the rim at one end, may be enlarged slightly, as shown at 10, to receive the other end 11 of the rim. The rim, adjacent its meeting ends, is provided with lugs 12. A screw 14 is right and left hand threaded into the lugs 12, and it will be seen that, after the tire 9 is loosely engaged about the rim 7, the screw 14 may be rotated, to cause the end 11 of the rim to slide in the end 10, thereby expanding the rim, and holding the tire 9 tightly in place upon the rim. From the foregoing it will be seen that the manner of mounting the tire 9 in place, and of removing the same, may be carried on in a simple manner, and without difficulty, by the owner of the vehicle.

In the central portion of the plate 1 there is an opening 15, through which extends a bushing 16. Spaced hub members 17 are mounted upon the ends of the bushing 16, the hub members 17 having upstanding flanges 18, between which the plate 1 is inclosed. Bolts 19 or other connecting elements adapted to a like end, may be extended through the flanges 18 of the hub members 17, and through the spoke plate 1, to hold the parts assembled, as seen most clearly in Fig. 2.

It is of course understood that the portions 5 of the spokes are resilient, and thus, the tire and the rim will be yieldingly supported, the desired resiliency being obtained without the use of pneumatic tires. The wheel is so constructed that it will be sufficiently resilient, without being unstable. Owing to the fact that the spokes 2 are formed integrally with the spoke plate 1, and owing to the fact that the spoke plate is bound firmly between the hub members 17, the wheel, in its hub portion, is made of unusual strength. In wheels which are provided with resilient spokes, a great strain is imposed upon the hub, and the hub, in the wheel of the present invention, is so designed that it will adequately bear the strain above referred to.

Having thus described the invention, what is claimed is:—

1. In a device of the class described, a spoke plate having integrally formed spokes projecting therefrom, the spokes being twisted, adjacent the plate, to extend transversely of the plate; a rim with which the outer ends of the spokes are engaged; hub members applied to opposite sides of the plate; and connecting elements extended through the hub members and through the plate.

2. In a device of the class described, a plate having integrally formed spokes projecting therefrom, the spokes being twisted adjacent the plate, to extend transversely of the plate; a rim assembled with the outer ends of the spokes; a bushing extended through the central portion of the plate; hub members mounted upon opposite ends of the bushing, and having upstanding flanges, inclosing the plate; and connecting elements extended through the flanges and through the plate.

In testimony that I claim the foregoing as my own, I have hereto affixed my signature in the presence of two witnesses.

FREDERICK H. JOHN.

Witnesses:
JOHN KLEIM,
THOMAS A. FARRELL.